UNITED STATES PATENT OFFICE.

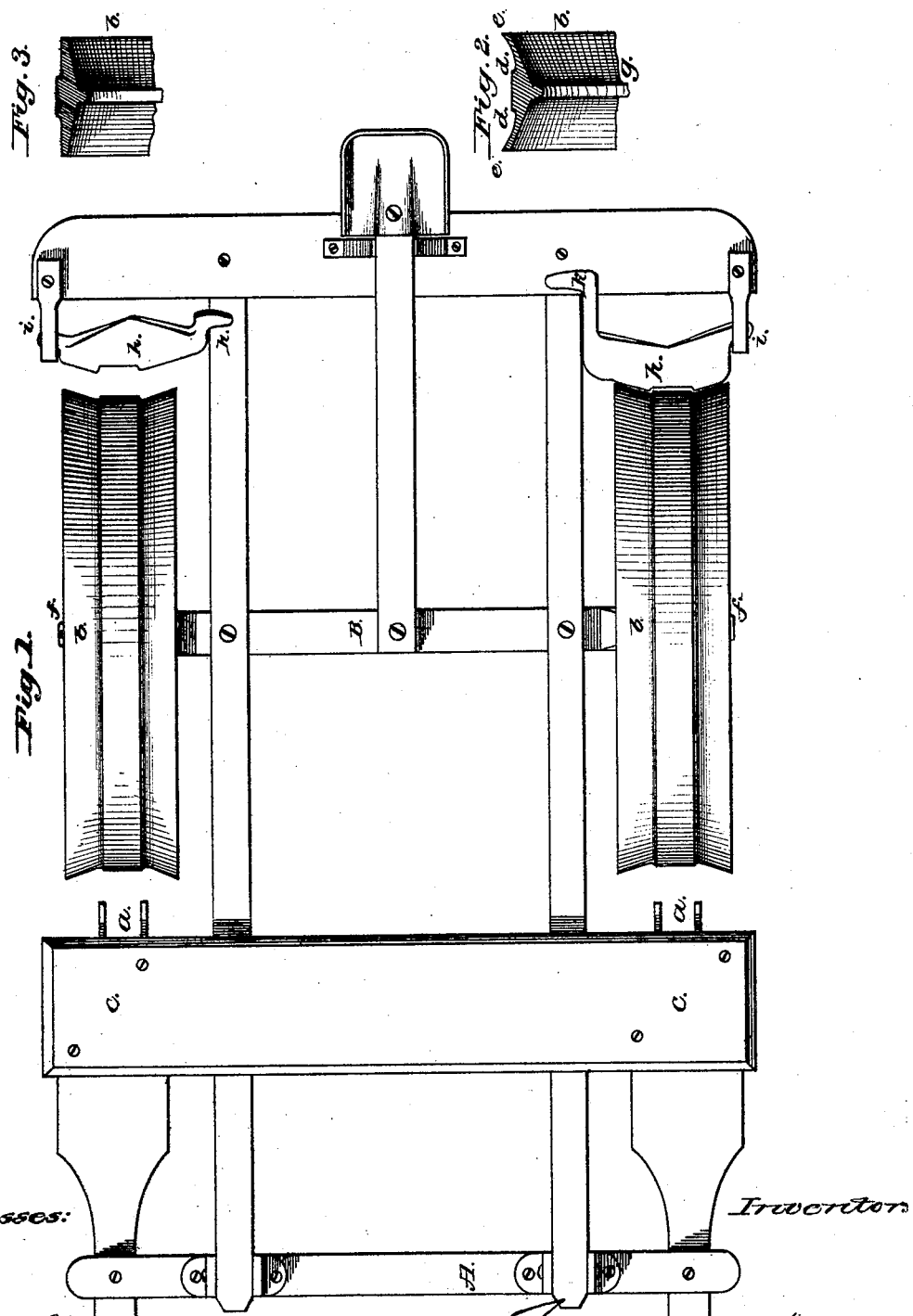

THOMAS A. GALT AND GEORGE S. TRACY, OF STERLING, ILLINOIS.

IMPROVEMENT IN CORN-PLANTERS.

Specification forming part of Letters Patent No. 171,791, dated January 4, 1876; application filed May 26, 1875.

*To all whom it may concern:*

Be it known that we, THOMAS A. GALT and GEORGE S. TRACY, of Sterling, in the county of Whitesides and State of Illinois, have invented certain Improvements in Corn-Planters, of which the following is a specification:

The first part of our invention relates to constructing the rim of the wheel of a corn-planter in such shape that the pressure of such wheel upon the ground may be increased in a certain part of the path of such wheel, the object of this part of our invention being to concentrate or increase such pressure upon the precise locality where such pressure is more particularly required, as hereinafter explained.

Figure 1 is a plan view of a machine embodying our invention. Fig. 2 is a transverse section of one kind of our wheels, with the rim raised or projected from $d$ to $d$, and curved inward from $d\,d$, respectively, to $e\,e$. Fig. 3 is a transverse section of another kind of our wheels, having the rim raised from $d$ to $d$, but being flat from $d\,d$, respectively, outward to the edge of the rim.

The two kinds of wheels are not used on the same machine, both wheels on the same machine being alike.

As will be seen, the machine is of the class of corn-planters in which the wheel or wheels follow the furrow-opener for the purpose of covering the corn.

A is the frame of that part of the machine which contains the furrow-openers $a\,a$. B is the frame of that portion of the machine which contains the wheels $b\,b$. The seed-grain is contained and carried in the hoppers $c\,c$, and is passed into the openings in the ground made by the furrow-openers.

There being nothing claimed in this application on account of the dropping device, the same is not shown.

In Fig. 2, the line from $e$ to $e$, by the way of $d\,d$, represents a transverse section of the rim or outer surface of one kind of our wheels. $f$ is the hub or center of such wheel, and $g$ the spokes or portions between the center and the outside or rim. The portions of the rim of the wheels $b\,b$ from $d$ to $d$ is made flat or parallel with the axes of the wheels. From the points $d\,d$, respectively, outward the surface of the rim recedes, forming depressions in such surface from $d$ and $d$, respectively, to the outer edge of the wheel. The points $e$ and $e$ on the hollow rimmed wheel, Fig. 2, are on a line with or slightly beyond the line from $d$ to $d$. The seed is covered in part by the dirt falling or rolling backward of its gravity into the furrow, and in part by the wheels $b\,b$ pressing the dirt down into or upon the furrow. The wheels $b\,b$ are of necessity made broad on the tire or rim; otherwise, carrying, as they do, the chief weight of the machine and that of the attendant, the wheels would sink into the ground to great depth, thus pressing the grain too far below the surface, and greatly increasing the draft of the machine. With the rim of the wheels thus necessarily wide, and from the fact that the line of the furrow is a depression, having in a measure sloping sides, the chief weight of former wheels and their superincumbent weight pressed upon each side of the furrow, rather than directly upon the latter. It is important that the dirt pressed or thrown outward by the furrow-opener should be pressed back upon the seed, as otherwise, by the action of the sun and air, the ground in the furrow will dry out, thus retarding or preventing the germination of the seed. Another disadvantage of imperfectly closing such furrow is, that the birds and squirrels can readily find the seed, and, in fact, soon learn to follow such furrow and take up the seed.

In former corn-planter wheels, from the fact of their having broad rims, and the pressure consequently extending laterally each way from the furrow, not sufficient pressure was had upon the furrow to satisfactorily close it.

In our wheel it is designed, by projecting that part of the rim from $d$ to $d$, as shown, to give sufficient pressure in the first instance directly upon the line of the furrow, so as to make sure of entirely closing the furrow. When this is accomplished the remaining portion of the rim, that from $d$ and $d$, respectively, outward, coming to the ground, shares the pressure, and prevents the wheels from entering the ground too deeply, as they would were the entire width of the rim no greater than from $d$ to $d$. The surface of the rim from $d$ and $d$ outward may be curved, as in Fig. 2, or may be flat, as in Fig. 3, the object being to first give sufficient pressure over the furrow to insure the closing of the latter, and then to extend the pressure laterally, which can be accomplished by either of the forms of rim given in the drawing. The scrapers *h h*, suspended at their axes *i i*, are so shaped upon their lower edge as to conform to the shape of the rim of the wheels upon which they operate, and by means of the short crank *k*, operated by the foot, either jointly or singly, such lower edge is forced at will against the outside of the rim, to prevent or remove the accumulation of dirt upon the latter.

The wheels may be made of different sizes. The ones we use are twenty-eight inches in diameter, and seven and one-half inches wide on the rim, the part from *d* to *d* being about two inches wide; but the proportion may be varied. The portion of the rim from *d* to *d* need not necessarily be flat, but may be either slightly convex or concave; but a straight surface from *d* to *d*, we think, is preferable.

We claim as our invention—

The wheels *b b*, provided with their raised rims from *d* to *d*, substantially as described, and for the purpose specified.

THOMAS A. GALT.
GEO. S. TRACY.

Witnesses:
JOHN W. ALEXANDER,
H. C. WARD.